United States Patent
Kray et al.

(10) Patent No.: US 11,692,444 B2
(45) Date of Patent: Jul. 4, 2023

(54) GAS TURBINE ENGINE ROTOR BLADE HAVING A ROOT SECTION WITH COMPOSITE AND METALLIC PORTIONS

(71) Applicant: General Electric Company, Schenectady, NY (US)

(72) Inventors: Nicholas Joseph Kray, Mason, OH (US); Nitesh Jain, Bangalore (IN)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/891,312

(22) Filed: Aug. 19, 2022

(65) Prior Publication Data
US 2022/0403741 A1 Dec. 22, 2022

Related U.S. Application Data

(63) Continuation of application No. 17/012,595, filed on Sep. 4, 2020, now Pat. No. 11,454,118.

(51) Int. Cl.
*F01D 5/02* (2006.01)

(52) U.S. Cl.
CPC .................................. *F01D 5/028* (2013.01)

(58) Field of Classification Search
CPC . F01D 5/282; F01D 5/284; F01D 5/30; F01D 5/3007; F01D 5/3084
See application file for complete search history.

(56) References Cited

U.S. PATENT DOCUMENTS

| | | | |
|---|---|---|---|
| 3,883,267 A | 5/1975 | Baudier et al. | |
| 4,966,527 A | 10/1990 | Merz | |
| 6,041,589 A | 3/2000 | Giffin, III et al. | |
| 8,075,280 B2 | 12/2011 | Jones | |
| 8,231,354 B2 | 7/2012 | Campbell et al. | |
| 8,475,132 B2 | 7/2013 | Zhang et al. | |
| 8,871,297 B2 | 10/2014 | Barnett et al. | |
| 9,518,470 B2* | 12/2016 | Illand | F01D 5/3007 |
| 9,896,189 B2 | 2/2018 | Tajan et al. | |
| 9,938,838 B2 | 4/2018 | Witz et al. | |
| 10,125,620 B2 | 11/2018 | Alvanos | |

* cited by examiner

*Primary Examiner* — Woody A Lee, Jr.
*Assistant Examiner* — Brian O Peters
(74) *Attorney, Agent, or Firm* — Dority & Manning, P.A.

(57) ABSTRACT

A rotor blade for a gas turbine engine includes an airfoil section and a root section extending along a longitudinal direction between an upstream surface and a downstream surface. The root section further extends along a radial direction between an inner surface positioned at an inner end of the root section and an outer end coupled to the airfoil section. Moreover, the root section extends along a circumferential direction between a first side surface and a second side surface. Furthermore, the root section defines a longitudinal centerline extending along the longitudinal direction and positioned equidistant from the inner surface and the outer end in the radial direction. The root section includes a first portion formed from a composite material and a second portion formed from a metallic material, with the longitudinal centerline extending through the second portion of the root section.

20 Claims, 6 Drawing Sheets

GAS TURBINE ENGINE ROTOR BLADE HAVING A ROOT SECTION WITH COMPOSITE AND METALLIC PORTIONS

CROSS REFERENCE TO RELATED APPLICATIONS

This application is a continuation of and claims the right of priority to U.S. patent application Ser. No. 17/012,595, filed Sep. 4, 2020, the disclosure of which is hereby incorporated by reference herein in its entirety for all purposes.

FIELD

The present subject matter relates to gas turbine engines and, more particularly, to rotor blades of a gas turbine engine.

BACKGROUND

A turbofan engine typically includes a fan, a nacelle, and a core gas turbine engine positioned within the nacelle. During operation of the turbofan, the core gas turbine engine drives or otherwise rotates the rotor blades of the fan relative to the nacelle. The rotation of the rotor blades, in turn, generates a flow of pressurized air, which may support the operation of the core gas turbine and/or be used as propulsive thrust for propelling an aircraft.

In general, a turbofan engine may have a closed rotor configuration or an open rotor configuration. More specifically, the fan is positioned within the nacelle in the closed rotor configuration. Conversely, in the open rotor configuration, the fan is positioned outside of the nacelle. In this respect, the open rotor configuration generally permits the use of a larger fan than the closed rotor configuration. However, it may be necessary to position one or more metallic cables within each rotor blade of the fan when engine has an open rotor configuration. For example, one end of each cable is coupled to a root section of a rotor blade, while the other end of the cable is positioned within an airfoil section of the blade.

In many instances, the rotor blades of the turbofan (e.g., the rotor blades of the fan and/or the core gas turbine engine) are formed from composite materials to reduce the weight of and/or increase the operating temperature range of the turbofan engine. However, the use of composite materials in turbofan engine rotor blades presents various challenges. For example, it is difficult to securely couple a metallic cable to the root section of a composite fan rotor blade.

Accordingly, an improved rotor blade of a gas turbine engine would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a rotor blade for a gas turbine engine. The rotor blade includes an airfoil section and a root section extending along a longitudinal direction between an upstream surface of the root section and a downstream surface of the root section. The root section further extends along a radial direction between an inner surface positioned at an inner end of the root section and an outer end coupled to the airfoil section. Moreover, the root section extends along a circumferential direction between a first side surface and a second side surface. Furthermore, the root section defines a longitudinal centerline extending along the longitudinal direction and positioned equidistant from the inner surface and the outer end in the radial direction. The root section includes a first portion formed from a composite material and a second portion formed from a metallic material, with the longitudinal centerline extending through the second portion of the root section.

In another aspect, the present subject matter is directed to a gas turbine engine. The gas turbine engine includes a fan, a compressor section, a turbine section, and a rotor blade positioned within one of the fan, the compressor section, or the turbine section. The rotor blade, in turn, includes an airfoil section and a root section extending along a longitudinal direction between an upstream surface of the root section and a downstream surface of the root section. The root section further extends along a radial direction between an inner surface positioned at an inner end of the root section and an outer end coupled to the airfoil section. Moreover, the root section extends along a circumferential direction between a first side surface and a second side surface. Furthermore, the root section defines a longitudinal centerline extending along the longitudinal direction and positioned equidistant from the inner surface and the outer end in the radial direction. The root section includes a first portion formed from a composite material and a second portion formed from a metallic material, with the longitudinal centerline extending through the second portion of the root section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
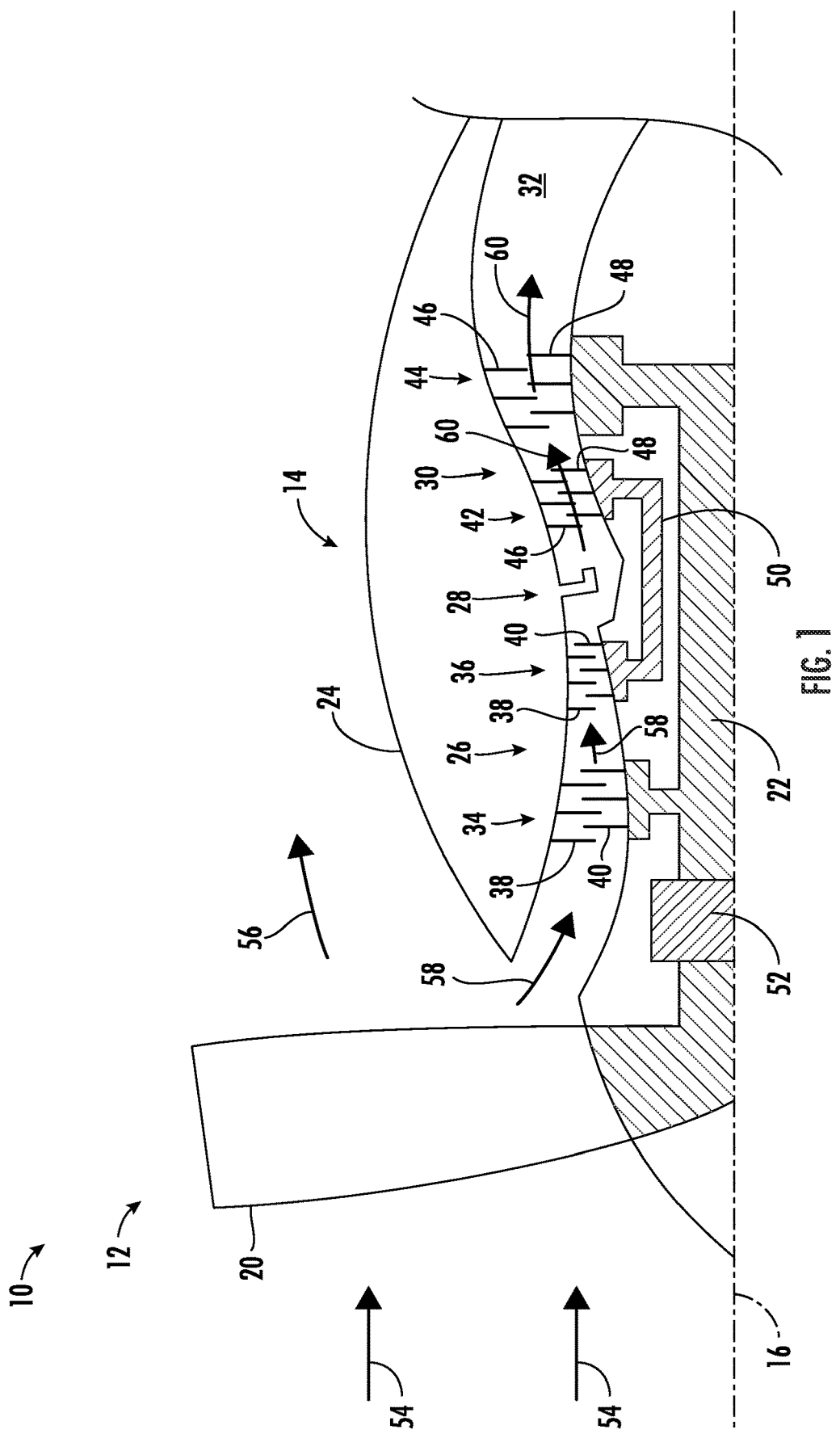
FIG. 1 is a schematic cross-sectional view of one embodiment of a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a rotor blade for a gas turbine engine. As will be described below, the disclosed rotor blade may be incorporated into a fan, a compressor, or a turbine of the gas turbine engine. More specifically, the rotor blade includes an airfoil section and a root section. The root section, in turn, extends along a longitudinal direction between an upstream surface and a downstream surface. Furthermore, the root section extends along a radial direction between an inner surface positioned at an inner end and an outer end coupled to the airfoil section. In this respect, the root section defines a longitudinal centerline extending along the longitudinal direction and positioned equidistant from the inner surface and the outer end in the radial direction.

The root section of the rotor blade is formed from a combination of composite and metallic materials. Specifically, in several embodiments, the root section includes one or more portions formed from a composite material, such as a ceramic matrix composite (CMC) material. Moreover, in such embodiments, the root section includes one or more portions formed from a metallic material, such as a titanium-, aluminum-, and/or nickel-based alloy. Moreover, the longitudinal centerline of the root section extends through the metallic portion(s). In some embodiments, the metallic portion(s) form portions of the exterior surfaces of the root section. However, in other embodiments, the composite portion(s) form the external surfaces of the root section (i.e., the metallic portion(s) may be encased within the composite portion(s)).

Using a rotor blade root section having a composite portion(s) and a metallic portion(s), with the longitudinal centerline of the root section extending through the metallic portion(s), provides various technical advantages. For example, one or more metallic cables may be positioned within the rotor blade. One end of each metallic cable, in turn, is coupled to (e.g., embedded within) a metallic portion of the root section, thereby providing a more secure connection than coupling the cable(s) to an entirely composite root section. Additionally, the inclusion of the composite portion(s) within the rotor blade (as opposed to an entirely metallic root section) reduces the weight of and increases the operating temperature range of the rotor blade.

Referring now to the drawings, FIG. 1 is a schematic cross-sectional view of one embodiment of a gas turbine engine 10. In the illustrated embodiment, the engine 10 is configured as an open rotor or unducted turbofan engine. However, in alternative embodiments, the engine 10 may be configured as a closed rotor or ducted turbofan engine, a turbojet engine, a turboprop engine, a turboshaft gas turbine engine, or any other suitable type of gas turbine engine.

In general, the engine 10 includes a fan 12 and a core engine 14 extending along an axial centerline 16. More specifically, the fan 12 may include a fan rotor 18 and a plurality of fan rotor blades 20 (one is shown) coupled to the fan rotor 18. In this respect, the fan rotor blades 20 are spaced apart from each along the circumference of the fan rotor 18 and extend outward from the rotor 18. Moreover, the core engine 14 may be positioned downstream from the fan 12 along the axial centerline 16. As shown, the core engine 14 is rotatably coupled to the fan rotor 18 via a low-pressure (LP) shaft 22, thereby permitting the core engine 14 to rotate the fan 12.

In several embodiments, the engine 10 also includes a nacelle or outer casing 24 surrounding various components of the core engine 14. More specifically, the nacelle 24 generally surrounds or encases, in serial flow order, a compressor section 26, a combustion section 28, a turbine section 30, and an exhaust section 32. For example, in some embodiments, the compressor section 26 may include a low-pressure (LP) compressor 34 and a high-pressure (HP) compressor 36 positioned downstream from the LP compressor 34 along the axial centerline 12. Each compressor 34, 36 may, in turn, include one or more rows of stator vanes 38 interdigitated with one or more rows of compressor rotor blades 40. Moreover, in some embodiments, the turbine section 30 includes a high-pressure (HP) turbine 42 and a low-pressure (LP) turbine 44 positioned downstream from the HP turbine 42 along the axial centerline 12. Each turbine 42, 44 may, in turn, include one or more rows of stator vanes 46 interdigitated with one or more rows of turbine rotor blades 48.

Additionally, the engine 10 includes the low-pressure (LP) shaft 22 and a high pressure (HP) shaft 50 positioned concentrically around the LP shaft 22. In such embodiments, the HP shaft 50 rotatably coupled the rotor blades 48 of the HP turbine 42 and the rotor blades 40 of the HP compressor 36 such that rotation of the HP turbine rotor blades 48 rotatably drives HP compressor rotor blades 40. As shown, the LP shaft 22 is directly coupled to the rotor blades 48 of the LP turbine 44 and the rotor blades 40 of the LP compressor 34. Furthermore, the LP shaft 22 is coupled to the fan 12 via a gearbox 52. In this respect, the rotation of the LP turbine rotor blades 48 rotatably drives the LP compressor rotor blades 40 and the fan blades 20.

In several embodiments, the engine 10 may generate thrust to propel an aircraft. More specifically, during operation of the engine 10, the fan 12 pressurizes incoming air (indicated by arrow 54). In this respect, a first portion (indicated by arrow 56) of the pressurized air 54 flows around the nacelle 24 (i.e., external to the nacelle 24) toward the rear of the engine 10. Conversely, a second portion (indicated by arrow 58) of the air 54 is directed into the compressor section 26 of the core engine 14. The second portion 58 of the air 54 first flows through the LP compressor 34 in which the rotor blades 40 therein progressively compress the second portion 58 of the air 54. Next, the second portion 58 of the air 54 flows through the HP compressor 36 in which the rotor blades 40 therein continue progressively compressing the second portion 58 of the air 54. The compressed second portion 58 of the air 54 is subsequently delivered to the combustion section 28. In the combustion section 28, the second portion 58 of the air 54 mixes with fuel and burns to generate high-temperature and high-pressure combustion gases 60. Thereafter, the combustion gases 60 flow through the HP turbine 42 in which the HP turbine rotor blades 48 extract a first portion of kinetic and/or thermal energy therefrom. This energy extraction rotates the HP shaft 50, thereby driving the HP compressor 36. The combustion gases 60 then flow through the LP turbine 44 in which the LP turbine rotor blades 48 extract a second portion of kinetic and/or thermal energy therefrom. This energy extraction rotates the LP shaft 22, thereby driving the LP compressor 40 and the fan 12 via the gearbox 52. The combustion gases 60 then exit the core engine 14 through the exhaust section 32.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
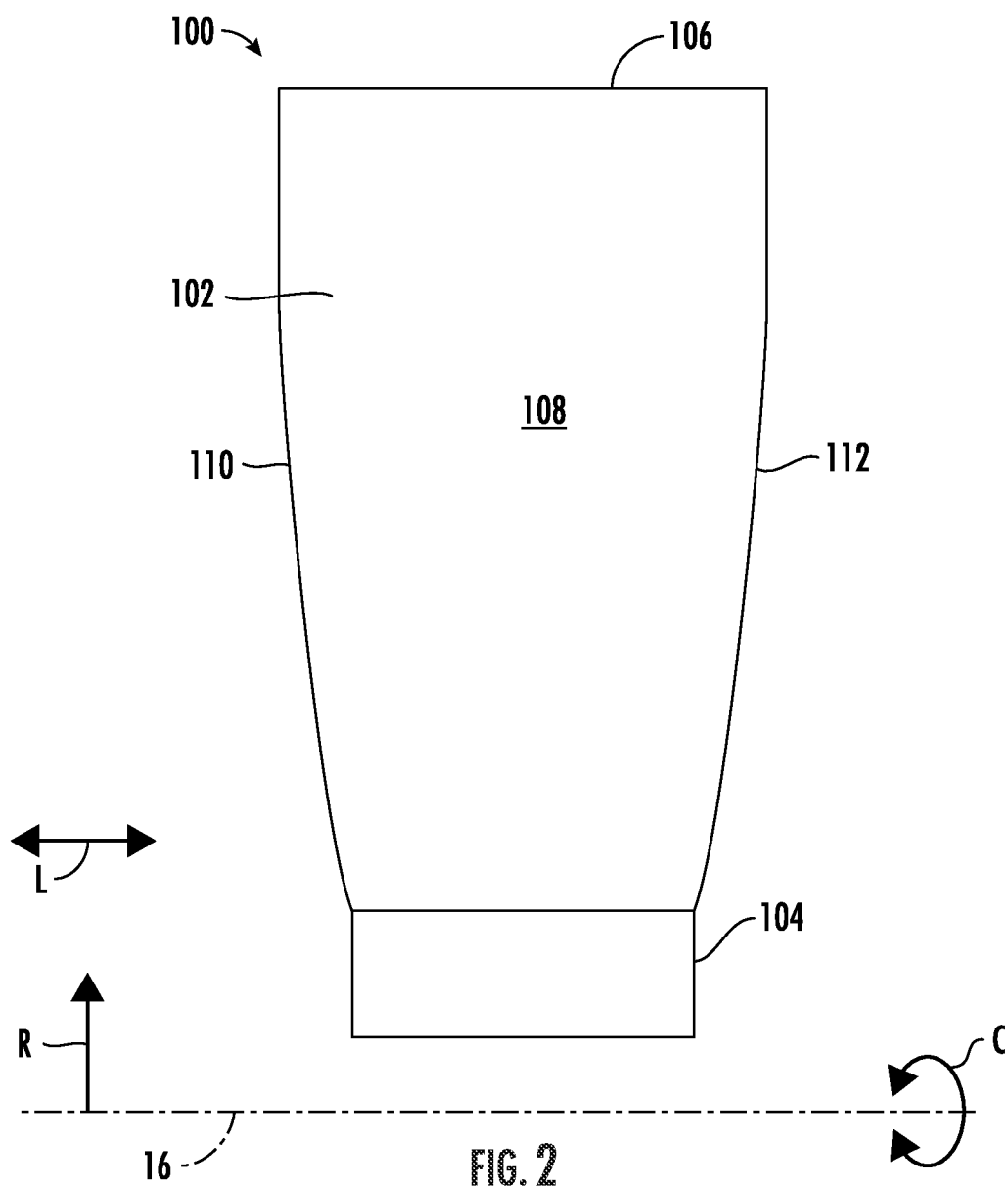
FIG. 2 is a side view of one embodiment of a rotor blade of a gas turbine engine.

FIG. 2 is a side view of one embodiment of a rotor blade 100, which may be incorporated into the engine 10 in place of any of the fan rotor blades 20, the compressor rotor blades 40, and/or the turbine rotor blades 48. As shown, the rotor blade 100 defines a longitudinal direction L, a radial direction R, and a circumferential direction C. In general, the longitudinal direction L extends parallel to the axial centerline 16 of the engine 10, the radial direction R extends generally orthogonal to the axial centerline 16, and the circumferential direction C extends generally concentrically around the axial centerline 16.

In several embodiments, the rotor blade 100 includes an airfoil section 102 and a root section 104. More specifically, in such embodiments, the airfoil section 102 extend outward from the root section 102 to a tip 106 along the radial direction R. Furthermore, the airfoil 102 includes a pressure-side surface 108 and an opposing suction-side surface (not shown). In this respect, the pressure side surface 108 and the suction side surface are joined together or interconnected at a leading edge 110 of the airfoil 102 and a trailing edge surface 112 of the airfoil 102. Additionally, as will be described below, the root section 104 secures the rotor blade 100 to a rotor disk (not shown) coupled the LP shaft 22 (FIG. 1) or HP shaft 50 (FIG. 1). However, in alternative embodiments, the rotor blade 100 may have any other suitable configuration. For example, in one embodiment, the rotor blade 100 may include a platform positioned between the airfoil section 102 and the root section 104 along the radial direction R.

Figure 3:
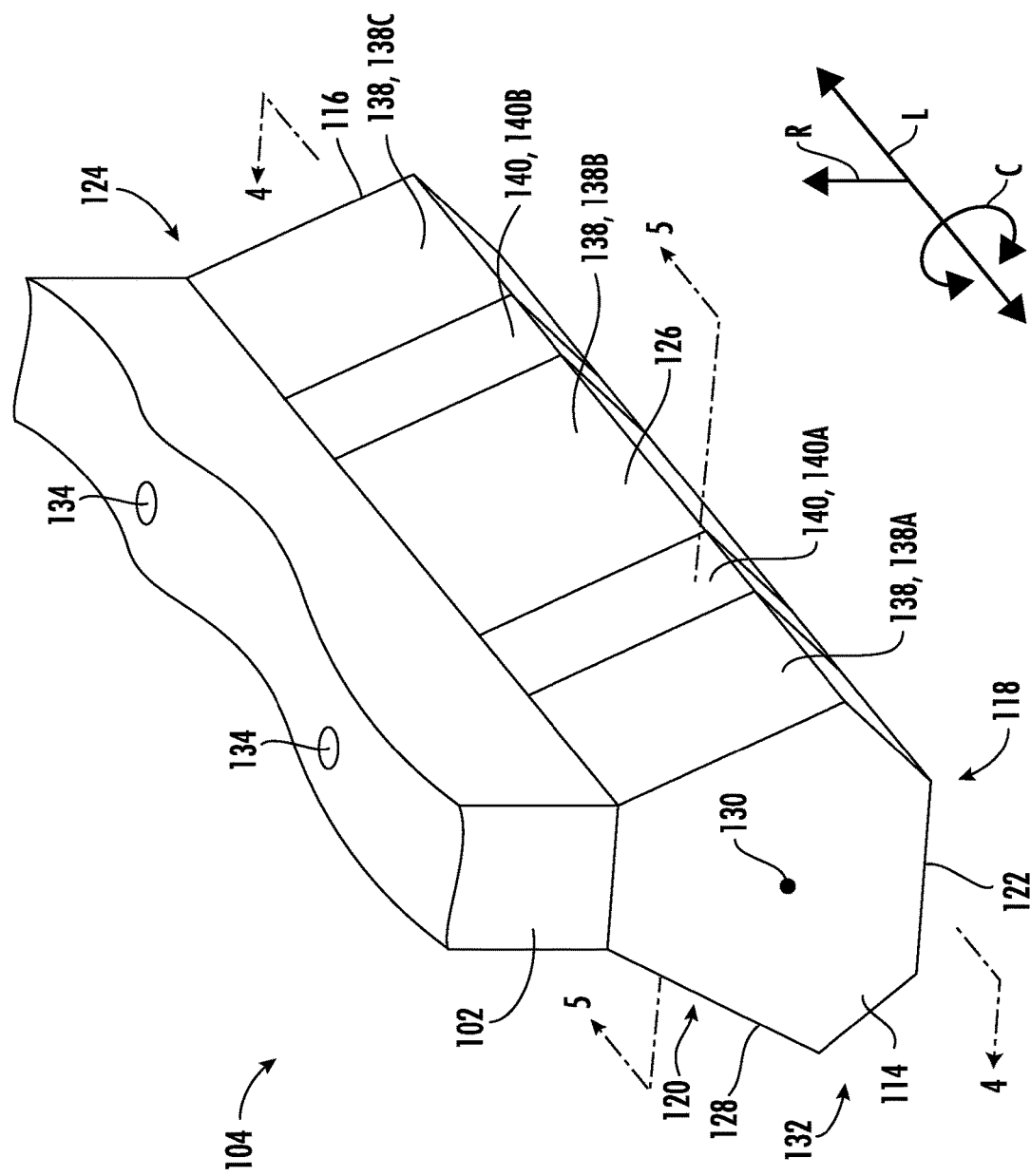
FIG. 3 is a partial perspective view of one embodiment of a root section of a rotor blade of a gas turbine engine.
Figure 4:
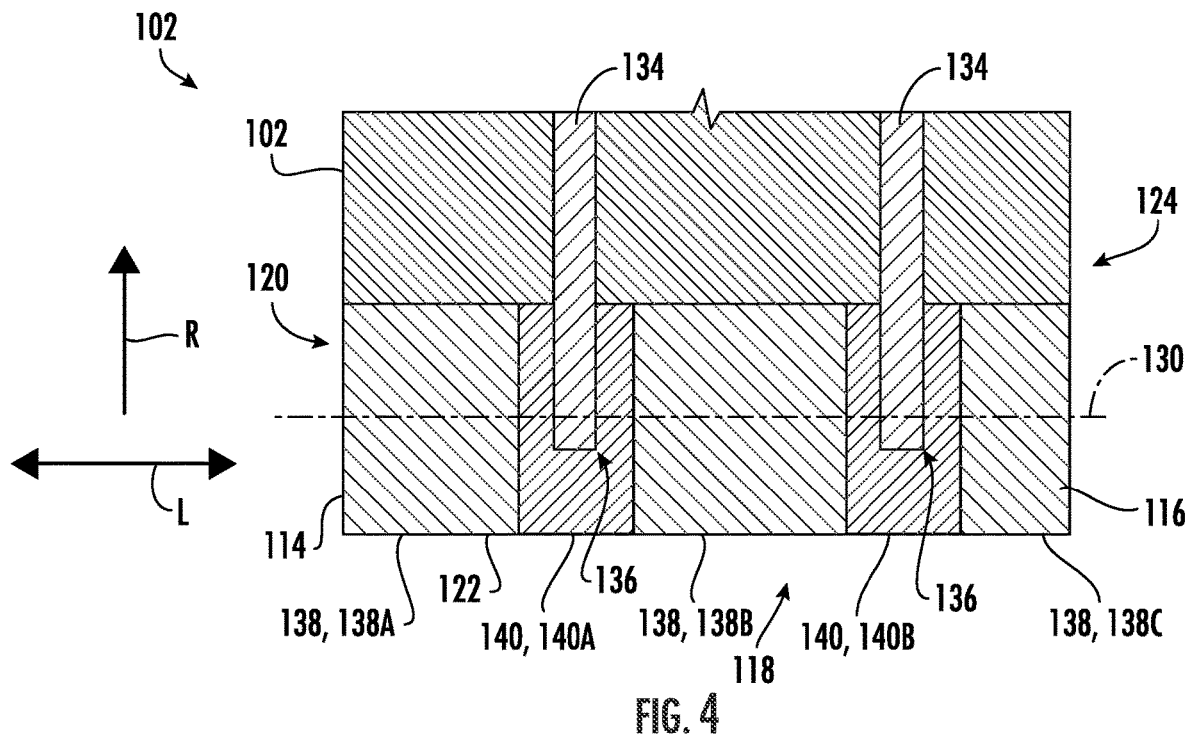
FIG. 4 is a cross-sectional view of the root section taken generally about line 4-4 in FIG. 4, particularly illustrating a longitudinal centerline of the root section extending through various composite and metallic portions of the root section.
Figure 5:
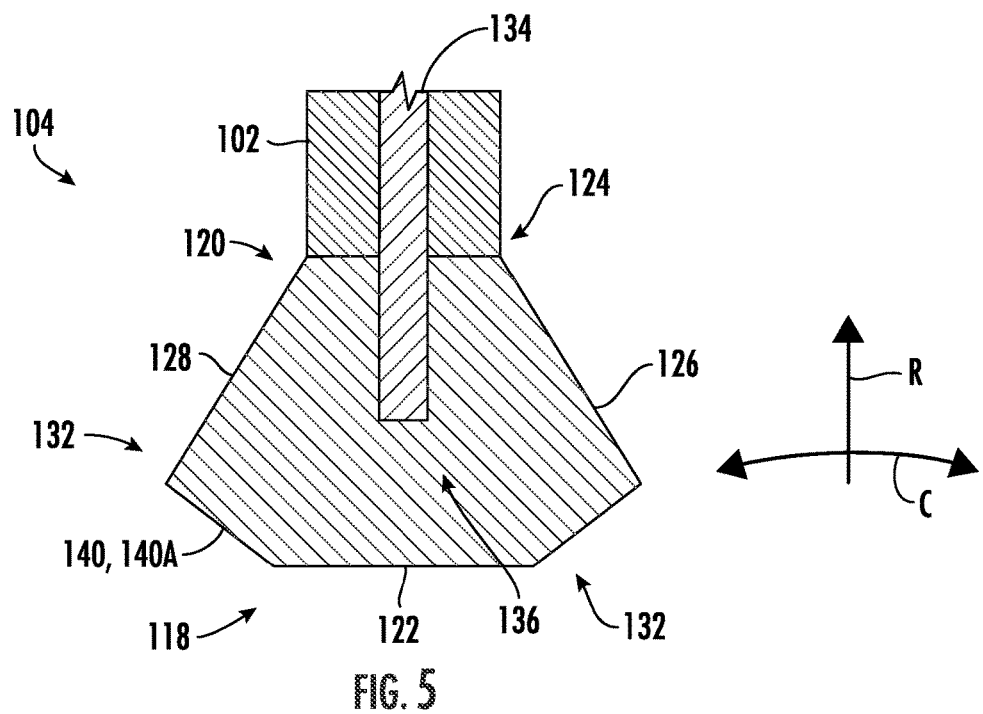
FIG. 5 is a cross-sectional view of the root section taken generally about line 5-5 in FIG. 4, particularly illustrating a metallic portion of the root section partially forming various surfaces of the root section.

FIGS. 3-5 are various views of one embodiment of a root section 104 of the rotor blade 100. Specifically, FIG. 3 is a partial perspective view of the root section 104. Moreover, FIG. 4 is a cross-sectional view of the root section 104 taken generally about line 4-4 in FIG. 4. In addition, FIG. 5 is a cross-sectional view of the root section 104 taken generally about line 5-5 in FIG. 4.

As shown in FIGS. 3-5, the root section 104 extends along the longitudinal, radial and circumferential directions L, R, C. More specifically, the root section 104 extends along the longitudinal direction L between an upstream surface 114 of the root section 104 and a downstream surface 116 of the root section 104. Furthermore, the root section 104 extends along the radial direction R between an inner end 118 of the root section 104 and an outer end 120 of the root section 104, with an inner surface 122 of the root section 104 positioned at the inner end 118. The outer end 120 of the root section 104, in turn, couples to an inner end 124 of the airfoil section 102. Additionally, the root section 104 extends along a circumferential direction C between a first side surface 126 and a second side surface 128. Moreover, as best illustrated in FIG. 4, the root section 104 defines a longitudinal centerline 130 extending along the longitudinal direction L and positioned equidistant from the inner surface 122 of the root section 104 and the outer end 120 of the root section 104 in the radial direction R.

In several embodiments, the root section 104 may have a dovetail configuration. More specifically, as shown in FIGS. 3 and 5, in such embodiments, the side surfaces 126, 128 extend outward (i.e., away from the longitudinal centerline 130) in the circumferential direction C as the root section 104 extends inward along the radial direction R from its outer end 120 to a position 132 located between the inner and outer ends 118, 120 along the radial direction R. Furthermore, the side surfaces 126, 128 extend inward (i.e., toward from the longitudinal centerline 130) in the circumferential direction C as the root section 104 extends inward along the radial direction R from the position 132 to its inner end 118. Thus, the side surfaces 126, 128 may define V-like shapes that provide the root section 104 with a dovetail configuration. However, in alternative embodiments, the root section 104 may have any other suitable configuration, such as a collet or a fir tree configuration.

Additionally, as shown in FIGS. 3-5, one or more metallic cables 134 may be coupled to otherwise partially positioned within the root section 104. Specifically, when the gas turbine engine (e.g., the engine 10) has an open rotor configuration, it may be necessary to position one or more metallic cables 134 with the rotor blades 100 of the associated fan section (e.g., the fan section 12). As such, in several embodiments, the metallic cable(s) 134 may be partially positioned within the airfoil section 102 and partially positioned within the root section 104. For example, each metallic cable 134 may extend from a first end 136 positioned within the root section 104 and a second end (not shown) positioned within the airfoil section 102. As will be described below, the first end 136 of each metallic cable 134 may be coupled to a portion of the root section 104. Moreover, the metallic cable(s) 134 may be formed of any suitable metallic material, such as a titanium-, aluminum-, or nickel-based alloy.

Furthermore, the root section 104 includes one or more portions 138 formed from a composite material and one or more portions 140 formed from a metallic material. Specifically, in several embodiments, the composite portions 138 may be positioned between the metallic portions 140. For example, as shown in FIGS. 3 and 4, in the illustrated embodiment, the root section 104 includes first second, and third composite portions 138A, 138B, 138C and first and second metallic portions 140A, 140B. In this respect, the first metallic portion 140A is positioned between the first composite portion 138A and the second composite portion 138B along the longitudinal direction L. Similarly, the second metallic portion 140B is positioned between the second composite portion 138B and the third composite portion 138C along the longitudinal direction L. In this respect, the first composite portion 138A forms the upstream surface 114 of the root section 104, while the third composite portion 138C forms the downstream surface 116 of the root section 104. However, in alternative embodiments, the root section 104 may include any other suitable number of composite and/or metallic portions 138, 140. Moreover, the composite and/or metallic portions 138, 140 may be positioned or arranged within the root section 104 in any other suitable manner.

Moreover, the composite portions 138 of the root section 104 may be formed from any suitable composite material. For example, the composite material may be selected from the group consisting of, but not limited to, a ceramic matrix composite (CMC), a polymer matrix composite (PMC), a metal matrix composite (MMC), or a combination thereof. Suitable examples of matrix material for a CMC matrix is ceramic powder, including but not limited to, silicon carbide, aluminum-oxide, silicon oxide, and combinations thereof. Suitable examples of matrix material for a PMC include, but are not limited to, epoxy-based matrices, polyester-based matrices, and combinations thereof. Suitable examples of a MMC matrix material include, but are not limited to powder metals such as, but not limited to, aluminum or titanium capable of being melted into a continuous molten liquid metal which can encapsulate fibers present in the assembly, before being cooled into a solid ingot with incased fibers. The resulting MMC is a metal article with increased stiffness, and the metal portion (matrix) is the primary load caring element.

Furthermore, the metallic portions 140 of the root section 104 may be formed from any suitable metallic material. In several embodiments, the metallic portions may be formed from the same metallic material as the metallic cable to facilitate a secure connection therebetween. For example, the metallic portions may be formed a titanium-, aluminum-, or nickel-based alloy.

Forming the root section 104 from one or more composite portions 138 and one or more metallic portions 140 provides various technical advantages. More specifically, as best illustrated in FIG. 4, the longitudinal centerline 130 of the root section 104 extends through each metallic portion 140. That is, a region of each metallic portion 140 is positioned at the radial center of the root section 104. Moreover, in several embodiments, the first end 136 of each metallic cable 134 is coupled to one of the metallic portions 140. For example, as shown in FIGS. 4 and 5, in the illustrated embodiment, the first end 136 of one of the metallic cables 134 is embedded or otherwise encased within the first metallic portion 140A, while the first end 136 of the other metallic cable 134 is embedded or otherwise encased within the second metallic portion 140B. In this respect, coupling the first end(s) 136 of the metallic cable(s) 134 to the metallic portion(s) of the root section 104 provides a more secure connection than coupling the cable(s) to an entirely composite root section. That is, a metal-to-metal connection is stronger than a metal-to-composite connection. Furthermore, positioning the metallic portion(s) at the radial center of the root section further increases the strength of the cable/root coupling. Additionally, the inclusion of the composite portion(s) within the root section 104 (as opposed to an entirely metallic root section) reduces the weight of and increases the operating temperature range of the rotor blade 100.

Figure 6:
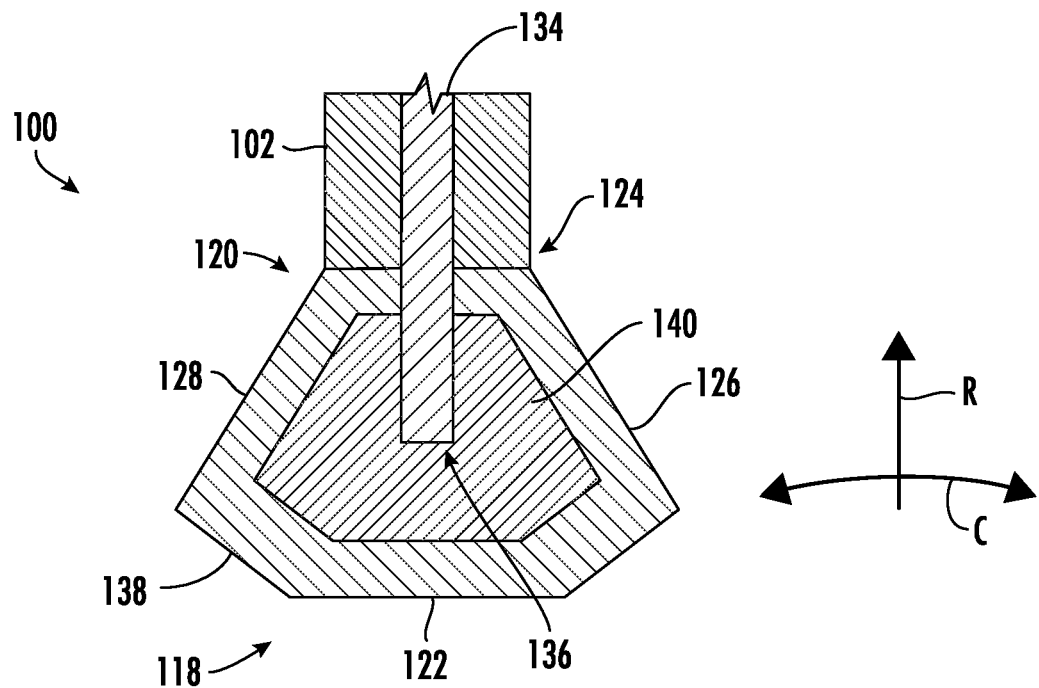
FIG. 6 is a partial cross-sectional view of another embodiment of a root section of a rotor blade of a gas turbine engine, particularly illustrating the composite portions of the root section forming the surfaces of the root section.

The metallic portion(s) 140 of the root section 104 may be exposed or encased by the composite portions 138. Specifically, in some embodiments, the metallic portion(s) 140 may be exposed such that the metallic portion(s) 140 form regions of one or more surfaces of the root section 104. For example, in the embodiment of the root section 104 shown in FIGS. 3-5, the metallic portion(s) 140 form regions of the inner surface 122, the first side surface 126, and the second side surface 128. In other embodiments, the metallic portion(s) 140 may be encased within or otherwise enclosed by the composite portion(s) 138. In such embodiments, the composite portion(s) 138 form the entirety of the surfaces of the root section 104. For example, in the embodiment shown in FIG. 6, the metallic portion(s) 140 is enclosed by the composite portion(s) 138 such that the composite portion(s) 138 defines the upstream surface 114, the downstream surface 116, the inner surface 122, the first side surface 126, and the second side surface 128.

Figure 7:
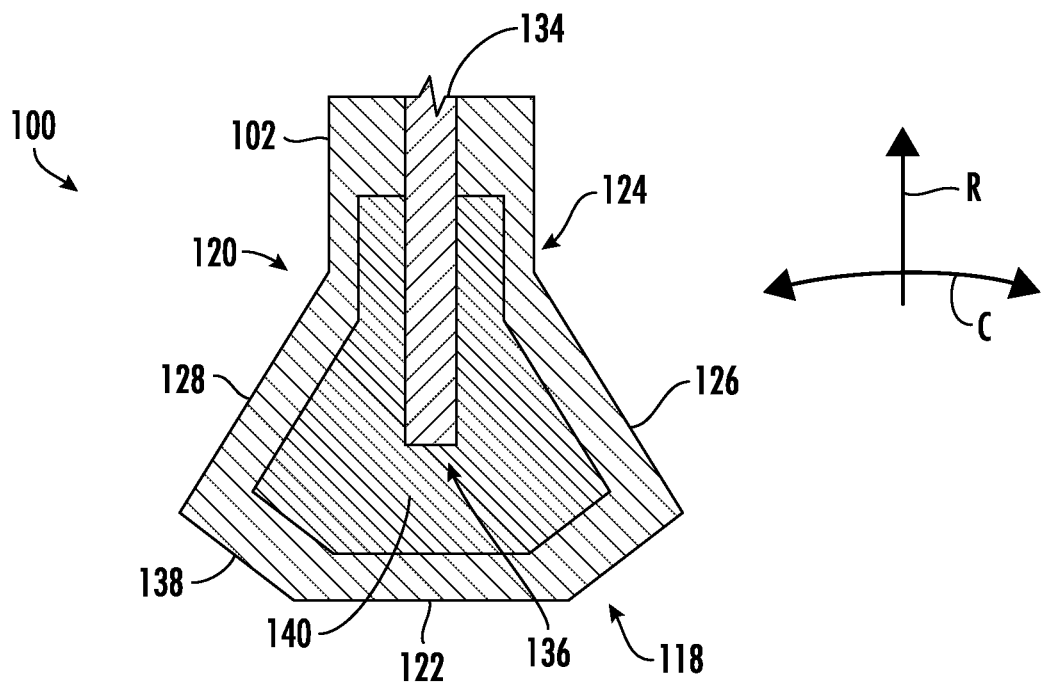
FIG. 7 is a partial cross-sectional view of a further embodiment of a root section of a rotor blade of a gas turbine engine, particularly illustrating a metallic portion of the root section extending outward along a radial direction beyond a bottom end of an airfoil section of the rotor blade.

As shown in FIGS. 4 and 5, in several embodiments, the metallic portions(s) 140 may be positioned inward along the radial direction R from the inner end 124 of the airfoil 102. In such embodiments, the metallic portion(s) 140 may not extend outward along the radial direction R past the outer end 120 of the root section 104. However, as shown in FIG. 7, in other embodiments, the metallic portion(s) 140 may extend outward along the radial direction R past the inner end 124 of the airfoil 102. In such embodiments, a region(s) of the metallic portion(s) 140 may be positioned outward from the inner end 124 of the airfoil section 102 in the radial direction R.

Figure 8:
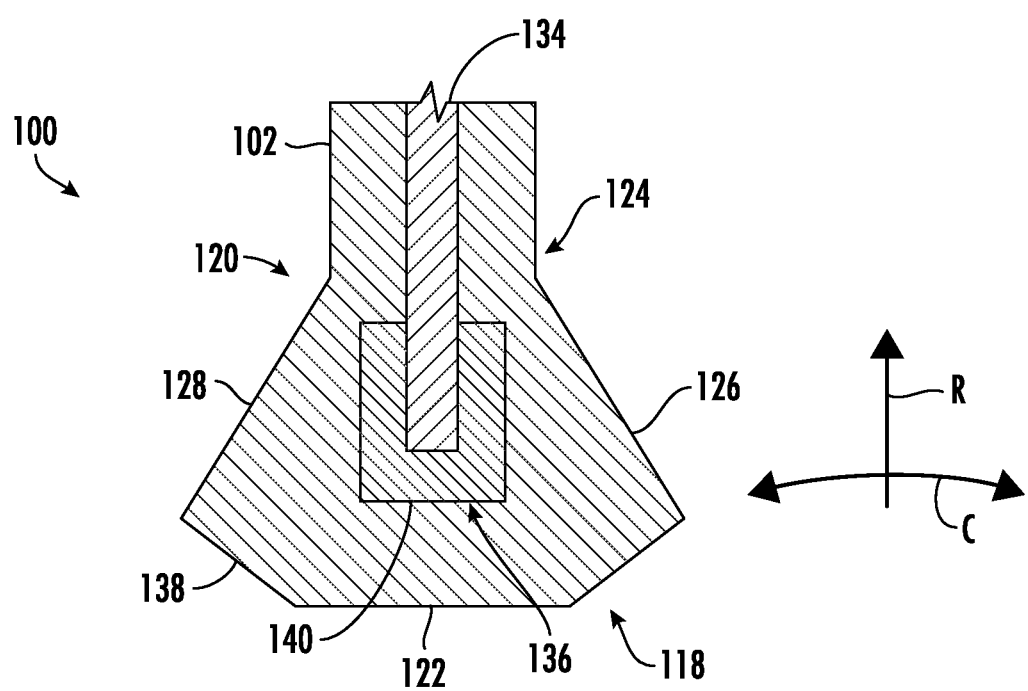
FIG. 8 is a partial cross-sectional view of yet another embodiment of a root section of a rotor blade of a gas turbine engine, particularly illustrating a metallic portion of the root section having a different cross-sectional shape than a composite portion of the rotor blade.

In addition, the composite and metallic portion(s) 138, 140 of the root section 104 may have any suitable cross-sectional shape. Specifically, in several embodiments, the metallic portion(s) 140 may have the same cross-sectional shape (i.e., in a plane defined by the radial and circumferential directions R, C) as the composite portion(s) 138 and/or the overall root section 104. For example, in the embodiments shown in FIGS. 5 and 6, the metallic portion(s) 140 has the same dovetail cross-sectional shape as the composite portion(s) 138 and the overall root section 104. In other embodiments, the metallic portion(s) 140 may have a different cross-sectional shape (i.e., in the plane defined by the radial and circumferential directions R, C) than the composite portion(s) 138 and/or overall root section 104. For example, in the embodiment shown in FIG. 8, the metallic portion(s) 140 has a rectangular cross-sectional shape, while the composite portion(s) 138 and the overall root section 104 have dovetail cross-sectional shapes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A rotor blade for a gas turbine engine, the rotor blade comprising: an airfoil section; and a root section extending along a longitudinal direction between an upstream surface of the root section and a downstream surface of the root section, the root section further extending along a radial direction between an inner surface positioned at an inner end of the root section and an outer end coupled to the airfoil section, the root section further extending along a circumferential direction between a first side surface and a second side surface, the root section defining a longitudinal centerline extending along the longitudinal direction and positioned equidistant from the inner surface and the outer end in the radial direction, the root section including a first portion formed from a composite material and a second portion formed from a metallic material, wherein the longitudinal centerline extends through the second portion of the root section.

The rotor blade of one or more of these clauses, further comprising: a metallic cable partially positioned within the airfoil section and partially positioned within the root section, the metallic cable including an end coupled to the second portion of the root section.

The rotor blade of one or more of these clauses, wherein the end of the metallic cable is embedded within the second portion of the root section.

The rotor blade of one or more of these clauses, wherein the first portion of the root section forms the upstream surface, the downstream surface, the inner surface, the first side surface, and the second side surface.

The rotor blade of one or more of these clauses, wherein the second portion of the root section forms a portion of at least one of the inner surface, the first side surface, or the second side surface.

The rotor blade of one or more of these clauses, wherein the second portion of the root section forms a portion of the inner surface, the first side surface, and the second side surface.

The rotor blade of one or more of these clauses, wherein the root section further includes a third portion formed from the metallic material, the third portion of the root section spaced apart from the second portion of the root section in the longitudinal direction.

The rotor blade of one or more of these clauses, wherein the first portion of the root section is positioned between the second portion of the root section and the third portion of the root section along the longitudinal direction.

The rotor blade of one or more of these clauses, further comprising: a first metallic cable coupled to the second portion of the root section; and a second metallic cable coupled to the third portion of the root section.

The rotor blade of one or more of these clauses, wherein the root section defines a dovetail cross-sectional shape.

The rotor blade of one or more of these clauses, wherein the first portion of the root section and the second portion of the root section define the same cross-sectional shape.

The rotor blade of one or more of these clauses, wherein the first portion of the root section and the second portion of the root section define different cross-sectional shapes.

The rotor blade of one or more of these clauses, wherein the second portion of the root section extends outward along the radial direction beyond an inner end of the airfoil section.

The rotor blade of one or more of these clauses, wherein the composite material comprises a ceramic matrix composite or a polymeric matric composite.

The rotor blade of one or more of these clauses, wherein the metallic material comprises at least one of titanium, aluminum, or nickel.

A gas turbine engine, comprising: a fan; a compressor section; a turbine section; and a rotor blade positioned within one of the fan, the compressor section, or the turbine section, the rotor blade comprising: an airfoil section; a root section extending along a longitudinal direction between an upstream surface of the root section and a downstream surface of the root section, the root section further extending along a radial direction between an inner surface positioned at an inner end of the root section and an outer end coupled to the airfoil section, the root section further extending along a circumferential direction between a first side surface and a second side surface, the root section defining a longitudinal centerline extending along the longitudinal direction and positioned equidistant from the inner surface and the outer end in the radial direction, the root section including a first portion formed from a composite material and a second portion formed from a metallic material, wherein the longitudinal centerline extends through the second portion of the root section.

The gas turbine engine of one or more of these clauses, further comprising: a metallic cable partially positioned within the airfoil section and partially positioned within the root section, the metallic cable including an end coupled to the second portion of the root section.

The gas turbine engine of one or more of these clauses, wherein the end of the metallic cable is embedded within the second portion of the root section.

The gas turbine engine of one or more of these clauses, wherein the first portion of the root section forms the upstream surface, the downstream surface, the inner surface, the first side surface, and the second side surface.

The gas turbine engine of one or more of these clauses, wherein the second portion of the root section forms a portion of at least one of the inner surface, the first side surface, or the second side surface.

What is claimed is:

1. A rotor blade for a gas turbine engine, the rotor blade comprising: an airfoil section; and a root section extending along a longitudinal direction between an upstream surface of the root section and a downstream surface of the root section, the root section further extending along a radial direction between an inner surface positioned at an inner end of the root section and an outer end coupled to the airfoil section, the root section further extending along a circumferential direction between a first side surface and a second side surface, the root section defining a longitudinal centerline extending along the longitudinal direction and positioned equidistant from the inner surface and the outer end in the radial direction, the root section including a first portion formed from a composite material and a second portion formed from a metallic material, the first portion forming the upstream surface, the downstream surface, a first portion of the inner surface, a first portion of the first side surface, and a first portion of the second side surface and the second portion forms a second portion of the inner surface, a second portion of the first side surface and a second portion of the second side surface, wherein the longitudinal centerline extends through the second portion of the root section.

2. The rotor blade of claim 1, further comprising:
a metallic cable partially positioned within the airfoil section and partially positioned within the root section, the metallic cable including an end coupled to the second portion of the root section.

3. The rotor blade of claim 2, wherein the end of the metallic cable is embedded within the second portion of the root section.

4. The rotor blade of claim 1, wherein the root section defines a dovetail cross-sectional shape.

5. The rotor blade of claim 1, wherein the first portion of the root section and the second portion of the root section define the same cross-sectional shape.

6. The rotor blade of claim 1, wherein the first portion of the root section and the second portion of the root section define different cross-sectional shapes.

7. The rotor blade of claim 1, wherein the second portion of the root section extends outward along the radial direction beyond an inner end of the airfoil section.

8. The rotor blade of claim 1, wherein the composite material comprises a ceramic matrix composite or a polymeric matrix composite.

9. The rotor blade of claim 1, wherein the metallic material comprises at least one of titanium, aluminum, or nickel.

10. A rotor blade for a gas turbine engine, the rotor blade comprising: an airfoil section; and a root section extending along a longitudinal direction between an upstream surface of the root section and a downstream surface of the root section, the root section further extending along a radial direction between an inner surface positioned at an inner end of the root section and an outer end coupled to the airfoil section, the root section further extending along a circumferential direction between a first side surface and a second side surface, the root section defining a longitudinal centerline extending along the longitudinal direction and positioned equidistant from the inner surface and the outer end in the radial direction, the root section including a first portion formed from a composite material and a second portion formed from a metallic material, the second portion extending outward along the radial direction beyond an inner end of the airfoil section, the first portion forming the upstream surface, the downstream surface, a first portion of the inner surface, a first portion of the first side surface, and a first portion of the second side surface and the second portion forms a second portion of the inner surface, a second portion of the first side surface and a second portion of the second side surface, wherein the longitudinal centerline extends through the second portion of the root section.

11. The rotor blade of claim 10, further comprising:
a metallic cable partially positioned within the airfoil section and partially positioned within the root section, the metallic cable including an end coupled to the second portion of the root section.

12. The rotor blade of claim 11, wherein the end of the metallic cable is embedded within the second portion of the root section.

13. The rotor blade of claim 10, wherein the first portion of the root section forms the upstream surface, the downstream surface, the inner surface, the first side surface, and the second side surface.

14. The rotor blade of claim 10, wherein the first portion of the root section and the second portion of the root section define the same cross-sectional shape.

15. The rotor blade of claim 10, wherein the first portion of the root section and the second portion of the root section define different cross-sectional shapes.

16. The rotor blade of claim 10, wherein the composite material comprises a ceramic matrix composite or a polymeric matrix composite.

17. The rotor blade of claim 10, wherein the metallic material comprises at least one of titanium, aluminum, or nickel.

18. A rotor blade for a gas turbine engine, the rotor blade comprising: an airfoil section; and a root section extending along a longitudinal direction between an upstream surface of the root section and a downstream surface of the root section, the root section further extending along a radial direction between an inner surface positioned at an inner end of the root section and an outer end coupled to the airfoil section, the root section further extending along a circumferential direction between a first side surface and a second side surface, the root section defining a longitudinal centerline extending along the longitudinal direction and positioned equidistant from the inner surface and the outer end in the radial direction, the root section including a first portion formed from a composite material and a second portion formed from a metallic material, the first portion and the second portion defining the same cross-sectional shape, the first portion forming the upstream surface, the downstream surface, a first portion of the inner surface, a first portion of the first side surface, and a first portion of the second side surface and the second portion forms a second portion of the inner surface, a second portion of the first side surface and a second portion of the second side surface, wherein the longitudinal centerline extends through the second portion of the root section.

19. The rotor blade of claim 18, further comprising:
a metallic cable partially positioned within the airfoil section and partially positioned within the root section, the metallic cable including an end coupled to the second portion of the root section.

20. The rotor blade of claim 19, wherein the end of the metallic cable is embedded within the second portion of the root section.

* * * * *